July 4, 1967  P. R. LEE  3,329,800

WATER HEATING APPARATUS

Filed Feb. 20, 1964

INVENTOR
Paul R. Lee
BY

' # United States Patent Office 3,329,800
Patented July 4, 1967

3,329,800
WATER HEATING APPARATUS
Paul R. Lee, Mansfield, Ohio, assignor to Westinghouse Electric Corporation, Pittsburgh, Pa., a corporation of Pennsylvania
Filed Feb. 20, 1964, Ser. No. 346,285
6 Claims. (Cl. 219—321)

The present invention relates to water heating apparatus, and more particularly to electric water heaters utilizing improved temperature control.

Most electric water heater on the market today use two adjustable thermostats, one being placed near the bottom of the heater tank and the other being placed near the top. The top thermostat is usually of the wide temperature differential, double throw type, while the bottom thermostat is of the narrow differential, single throw type. One set of contacts of the top thermostat is connected in series with the top heating element of the water heater, with the other set of contacts being connected in series with the contacts of the bottom thermostat. In such an arrangement it is impossible for both the top and bottom heating elements to be simultaneously energized, since the bottom heating element cannot be energized unless the top thermostat causes the top heating element to be in its unenergized condition. The standard system as described above causes the bottom thermostat to be the workhorse of the water heater. The bottom thermostat under normal usage has been found to cycle from 5 to 25 times as often as the top thermostat. The bottom thermostat is usually set at a fixed temperature of approximately 150° F. Whenever hot water is taken from the water heater, cold water will enter into the bottom of the tank causing the bottom thermostat to go on to energize the bottom heating element. The bottom thermostat must stay on until the entire tank is brought up to the required temperature. However, the top thermostat remains in its open position, the top heating element being unenergized, during most of the time and comes on only when most of the hot water from the tank has been depleted. When the top thermostat finally closes it is often too late with cold water coming out of the heater. The top thermostat thus rarely cycles having a wide temperature differential and being located at an appreciable distance from incoming cold water. The inefficiency of such a system can also be seen in that the top thermostat is a relatively expensive double throw type which does not provide desirable function of supplying hot water fast. Moreover, one set of contacts of the top thermostat being connected in series with the contacts of the bottom thermostat generates internal heat in the top thermostat making it difficult to close the top thermostat when it is necessary for it to cycle on the top heating element.

The recent use of high wattage heating elements which very quickly introduce large quantities of heating energy into the water has raised new problems. If ordinary thermostats are used with low resistance bridge members between the contacts of the thermostat, little internal thermostat heat is generated unless the thermostat is operated in a closed position for a relatively extended period of time. High wattage heating elements are designed only to be energized for a short period of time and in this period of time supply a large amount of heating energy to the water. Thus, if the thermostat does not have a similar or matched response time to that of the high wattage heating element there will be a lag in the thermostat being switched to its open position. If such should be the case, an excess amount of energy will be introduced into the water, and, therefore, will overheat the contents of the heater. Depending upon the amount of overheating caused, injury to persons and fabrics might result.

It is therefore an object of the present invention to provide new and improved fluid heating apparatus.

It is a further object of the present invention to provide new and improved water heater apparatus having an efficient, rapid and low cost operating cycle.

It is a further object of the present invention to provide new and improved water heater apparatus in which a low cost design is provided with the optimum usage of existing components.

It is a further object of the present invention to provide new and improved water heating apparatus operating under a highly efficient cycle by the matching of heating and thermostat elements.

Generally, the present invention provides water heating apparatus in which the top thermostat is the more frequently used in that it is a narrow temperature differential, double throw-type, and since the bottom thermostat is operative to close at a lower temperature than the top thermostat. Also, internal heat is selectively generated within the thermostats to match high wattage ratings of the heating elements.

These and other objects and advantages of the present invention will become apparent when considered in view of the following specification and drawings, in which.

Figure 1:
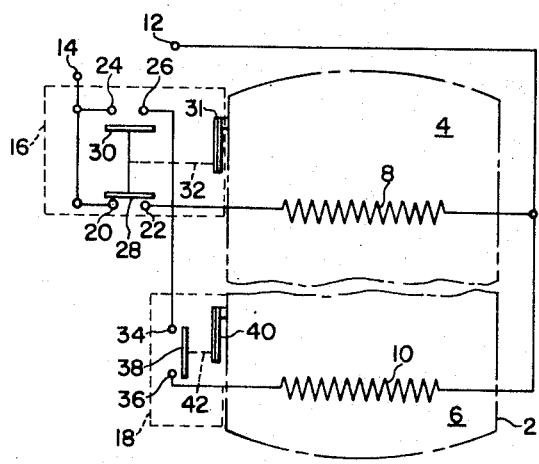
FIGURE 1 is a schematic diagram showing the teachings of the present invention.

Referring to FIG. 1, a water heater is shown schematically having a tank 2 to contain water. The water tank 2 has a top portion 4 and a bottom portion 6. Disposed in the top portion 4 is a top heating element 8, which may for example be a high wattage wound wire sheath type of heating element. In the bottom portion 6 of the water tank 2 is disposed a bottom heating element 10, which may be similar to the top heating element 8 and preferably of the high wattage variety. The electrical input to energize the heating elements 8 and 10 is provided through a pair of input terminals 12 and 14. The input terminals 12 and 14 may be supplied from a source of potential, for example, 240 volts, 60 cycles per second, usually available locally.

To provide the necessary control for the water heater, a top thermostat 16 and a bottom thermostat 18 are provided. The top thermostat 16 is a double throw-type having a bottom pair of contacts 20 and 22 and a top pair of contacts 24 and 26. A pair of bridge members 28 and 30 are mechanically connected together and respectively provide electrical contacts between the bottom pair of contacts 20 and 22 and the top pair of contacts 24 and 26. An electrical circuit is completed through the top heating element 8 from the input source across the terminals 12 and 14 to the contact 20, the bottom bridge member 28, the contact 22, the heating element 8 and then to the input terminal 12. In FIGURE 1, the top thermostat 16 is shown in its closed position with the top heating element 8 being energized to supply heat energy to water within the tank 2 in the top portion 4 thereof. A bimetallic member 31 is disposed adjacent the top portion 4 of the tank 2 in order to sense the temperature of the water in the top portion of the tank. The bimetallic member 31 is connected mechanically, as shown by the dotted line 32, to the pair of bridge members 28 and 30. The bimetallic member 31 is responsive to the water temperature in the top portion 4 in such a manner to cause the bottom bridge member 28 to complete a circuit between the bottom contacts 20 and 22 when the temperature of the water within the top portion 4 is below a predetermined value. When the water temperature is below this predetermined value, an open circuit will exist between the contacts 24 and 26 with the bridge member 30 being disengaged from these latter named contacts. If the temperature of the water exceeds a predetermined value, the bimetallic strip 31 will give a mechanical output to disengage the bottom bridge member 28 from the contacts 20 and 22 and cause the bridge member 30 to engage the top contacts 24 and 26 to create an electrical circuit therethrough. If the temperature should then drop below the first named predetermined value the top thermostat 16 would then return to its state as shown in FIGURE 1 with the bridge member 28 engaging the bottom contacts 20 and 22 and the bridge member 30 being disengaged from the top contacts 24 and 26. There is selected a narrow temperature differential between the predetermined temperature required to close the top thermostat 16 and energize the top heating element 8 and the other predetermined temperature necessary to open the top thermostat 16 and deenergize the top heating element 8. For example, the top thermostat 16 may be designed to have a temperature differential of around 12° F. and be calibrated to heat water to 150° F. for household use so that the thermostat 16 will close if the temperature in the top portion of the water heater drops below approximately 138° F.

The bottom thermostat 18 is disposed adjacent the bottom portion 6 of the water tank 2. The bottom thermostat 18 includes a pair of contacts 34 and 36 and a bridge member 38 which is operative to complete a circuit between the contacts 34 and 36. The contact 34 is connected to the contact 26 of the top thermostat and the contact 36 is connected to one end of the bottom heating element 10 which has its other end connected to the input terminal 12. A bimetallic strip 40 is disposed adjacent the water in the bottom portion 6 of the heated tank 2. The bimetallic member 40 is mechanically connected, as shown by the dotted line 42, to the bridge member 38. The bottom thermostat 18 may be described as a wide differential, low temperature, single throw device. It is not necessary, however, that the thermostat 18 be a wide differential-type, but may be a narrow differential one as is the top thermostat 16. The thermostat 18 in FIGURE 1 is shown in its open position with the bridge number 38 disengaged from the contacts 34 and 36, which will be the case if the temperature in the bottom portion 6 exceeds a predetermined temperature. This predetermined temperature may, for example, be 130° F. The temperature differential of the bottom thermostat 18 should be selected to be higher than the temperature differential of the top thermostat 16 and may, for example, be 30° F. as compared to the 12° F. temperature differential of the top thermostat 16 so that the bottom thermostat 18 will close at approximately 100° F. When the temperature in the bottom portion 6 falls below the predetermined temperature, 100° F., the bimetallic member 40 is responsive to move the bridge member 38 into engagement with the contacts 34 and 36. An electrical circuit is provided to the bottom heating element 10 in case the top thermostat 16 is in its open position, that is, with the bridge member 30 engaging the top contacts 24 and 26 and the bottom bridge member 28 being away from the bottom contacts 20 and 22 so that no current is being supplied to the top heating element 8. The electrical circuit is then completed from the input terminals 12 and 14, through the contact 24, the bottom bridge member 30, the bottom contact 26 to the terminals 34, the bridge member 38, the contact 36 and the bottom heating element 10 to the input contact 12. Thus, it can be seen that the bottom heating element 10 can only be energized when the top heating element 8 is not energized.

Under the present system, the top thermostat 16 becomes the "workhorse" of the water heater because it normally comes on before the bottom thermostat closes and is only sensitive to the water in the top portion 4 being heated. Moreover, the bottom thermostat 18 is kept in its open position while the top thermostat 16 is in its closed position, thereby preventing energization of the bottom heating element 10 while the top portion of the water is being heated. Since heated water is taken from the top portion of the water heater and since the top thermostat is calibrated to close at a higher temperature, for example, 138° F. compared to 100° F. for the bottom thermostat, the top thermostat will cycle on much more frequently than will the bottom thermostat 18. If the temperature of water in the top portion 4 should drop below approximately 138° F. the top heating element 8 is immediately energized to reheat the water to the desired temperature. The bottom portion of the tank 6 must be cooler than 100° F. before the bottom thermostat 18 will be responsive to energize the bottom heating element 10, and, thus, will cycle relatively few times compared to the top thermostat. Moreover, the radiation losses from the tank as a whole will be reduced since the bottom portion of the tank operates at a lower operating tempereature than the top portion.

Another feature of the present teaching is found in the use of high resistance, heat producing materials for the bridge member 28 of the top thermostat 16 and the bridge member 38 of the bottom thermostat 18. If the heating elements 8 and 10 are of the high wattage type, the use of high resistance heat producing bridge member in series with this element will produce a desirable effect. The high resistance heat producing material may, for example, be Monel. High wattage heating elements produce large quantities of heat energy in a very short period of time. Thus, if the elements 8 and 10 are energized they will quickly heat the water within their respective top and bottom portions to the required temperature and then should be deenergized. Because of the high speed of heating, the bimetallic strips will lag in time the actual temperature of the water. Therefore, a time delay will occur before the thermostat 16 or 18 will be deenergized even though the water will be at the desired temperature. This will result in an overheating of the associated water because of the heating element being energized for longer than is required causing excess energy to be supplied to the water. By providing a high resistance bridge member in the series with the heating element a certain amount of internal heat will be generated in the thermostat assembly itself. By introducing a given amount of internal heat, the thermal time lag will be compensated for and the thermostats may be energized sooner so as not to overheat the water within the tank. By matching the wattage rating on the respective heating elements through the use of a heat producing bridge member the temperature of the water can be anticipated so as to permit the deenergization of the heating element at the correct temperature. The high resistance element can be selected in thickness and length so as to match the wattage ratings and size of a given heating element and water tank so as to provide an accurate compensation.

Figure 2:
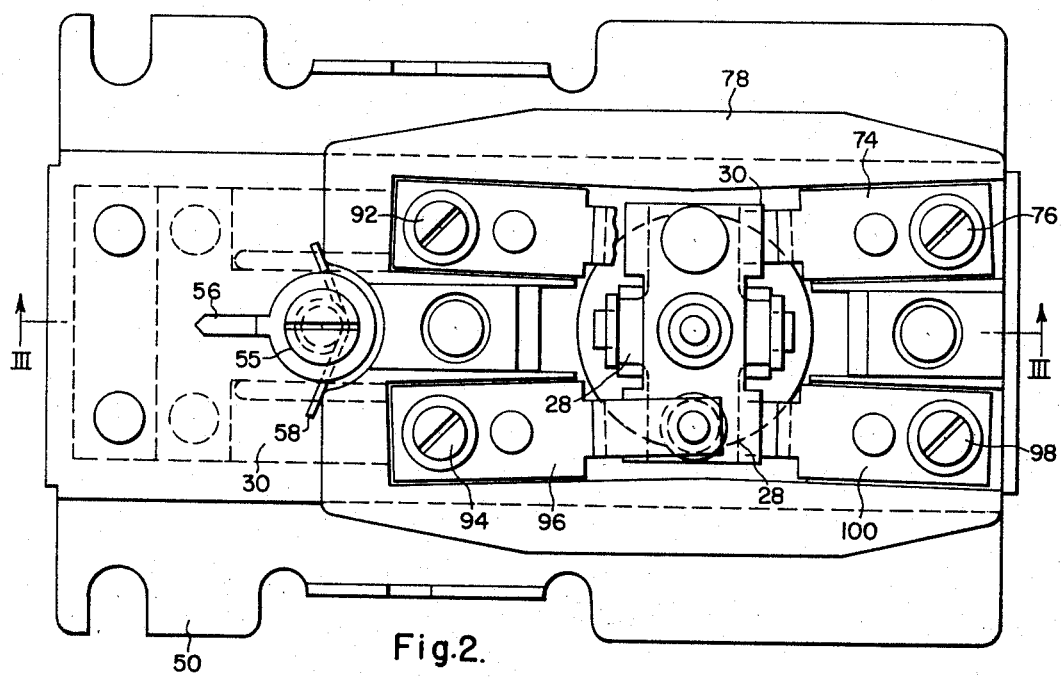
FIG. 2 is a top view showing the top thermostat of the present invention.
Figure 3:
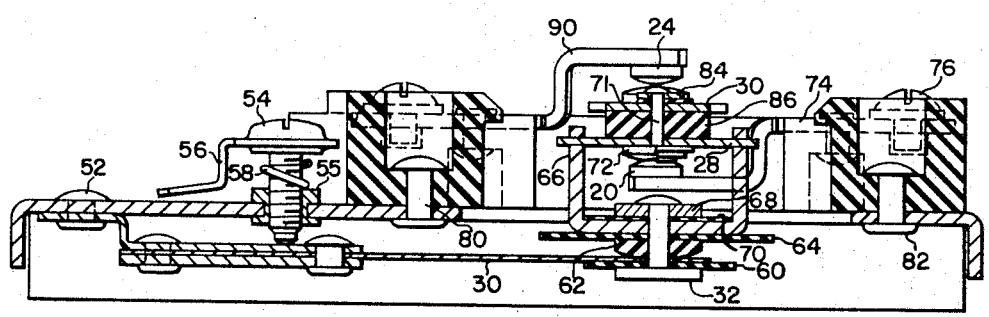
FIG. 3 is a sectional view taken along the line III—III of FIG. 2.

With reference to FIGS. 2 and 3, a specific design for the top double throw, narrow differential thermostat 16 will now be described. The thermostat 16 has a base member 50 comprising a good heat conducting material such as aluminum. The base 50 is mounted contiguously to the tank 2 of the water heater so that the bimetallic member 30 may provide a good indication in response to the water temperature in the top portion 4 of the water heater. The bimetallic member 30 is secured to the base 50 by a rivet 52. Various temperatures may be selected for the thermostat through the use of an adjustment screw 54 which extends down through the base member 50 in an inside threaded bearing 55 and engages against the bimetallic member 30. An indicating arm 56 is provided so that various temperatures may be provided by either adding increased tension to the bimetallic member 30 or taking tension away from it.

The screw 54 is held in tension by a spring 58. The bimetallic member 30 is attached mechanically to the contacts of the thermostat by a rivet 32, which corresponds to the mechanical connection 32 of FIGURE 1. The bimetallic strips 30 is placed between two insulating washers 60 and 62, which for example may comprise mica or a ceramic insulating material. Another insulating washer 64 which may comprise mica is fitted over the rivet 32 just below a U-shaped connecting member 66. The connecting member 66 may, for example, comprise an electrically conducting material such as brass and extends upwardly through an aperture in the base member 50. A metal washer 68 and an insulating washer 70 are fitted over the connecting member 66 and are held in place by the rivet 32. The heat producing bridge member 28 is held in place through extensions thereon fitting into apertures in the U-shaped connecting member 66. A contact assembly 71 has a contact 72, only one contact is shown in FIG. 2, at one end thereof secured to the bottom of the heat producing bridge 28 and which may be held in fixed engagement to the contact 20 which is secured to a conducting member 74. A terminal bolt 76 is provided to provide external terminations which in a circuit configuration of FIG. 1 would go to the input terminal 14.

An insulating shell 78, which may comprise a hard plastic, is fitted over the base member 50 and is secured thereto by rivets 80 and 82. The shell member 78 serves to provide supporting means for the conducting member 74 and the bolt 76. The contact assembly 71 has disposed on the other end thereof a contact 84 which is disposed and secured to the low resistance non-heat producing bridge member 30, which may for example comprise brass. An insulating washer 86 is disposed between the non-heat producing bridge member 30 and the heat producing bridge member 28. The contact 24 is placed in the proximity of the contact 84 to make electrical contact thereto in response to the bimetallic strip 30 giving an upward movement in response to temperature to disengage the contacts 20 and 72 and thereby engage the contacts 24 and 84. The contact 24 is secured to a conducting member 90 which extends to the insulating shell 78 and is engaged by a terminal bolt 92 which provides electrical terminating means for the contact 24, and which in the present example would be connected to the input terminal 14.

As better seen in FIG. 2, a terminal bolt 94 is connected to a conducting member 96 to the terminal 26. The terminal bolt 94 would serve as external electrical termination to the contact 34 of the bottom thermostat 18. A terminal bolt 98 is connected to a conducting member 100 which in turn is connected to the contact 22. The terminal bolt 98 would serve as an electrical connection to the top heating element 8.

In the views as shown, the top thermostat 18 is in its closed position with the high resistance heat producing bridge 28 connected in series with the top heating element 8. This indicates that when the water temperature in the top portion 4 is below a predetermined value heat energy must be added to the water. As the water is being heated by the heating element 8, internal heat is being generated by current passing through the heat producing bridge member 28. The bridge member 28 is so selected that it will match the characteristics of the heating element 8. Therefore, the bimetallic member 30 will be responsive to both the internal heat generated and the water temperature at the wall of the tank 2 to cause the bimetallic strip 30 to give a mechanical response when the predetemined open temperature is reached. At this temperature the bridge member 28 is forced from the contracts 20 and 22 and the non-heat producing bridge element 30 engages the contacts 24 and 26. With the thermostat in the deenergized open position, the top heating element 8 will be out of circuit until the water temperature again drops below a predetermined value to cause the bimetallic member 30 to give a mechanical output to reengage the bridge member 28 to the contacts 20 and 22.

As explained above the top thermostat 18 is the "workhorse" of the water heater. The bottom thermostat closes to energize the bottom heating element 10 only if two conditions are fulfilled: (1) the top thermostat 16 must be in its open condition, with the top heating element 8 deenergized, and (2) the water temperature in the bottom portion 6 of the tank 2 must be below a predetermined value, with the predetermined value being selected to be at a lower temperature than the predetermined energization value of the top thermostat 16. For example, the bottom predetermined temperature might be established at 130° F. (closing at 100° F. with a 30° differential) while the top predetermined temperature would be selected at 150° F. (closing at 138° F. with a 12° differential). Thus, the top thermostat 16 will cycle on if water is extracted from the water heater to lower the temperature below 138° F. with the water being rapidly reheated through the high wattage heating element 8 and then being deenergized by the action of the thermostat 16 aided by the internal heat generated by the heat producing bridge member 28. The bottom thermostat 18 will remain deenergized until the temperature in the bottom portion 6 of the heater is reduced below 100° F. and then will only be cycled on when the temperature in the top portion of the water heater has been exceeded to deenergize the top thermostat 16. As noted above it is not critical that the bottom thermostat 18 be of the wide differential type but may be a narrow differential type similar to the top thermostat 16. Under these conditions, if no water is drawn the bottom thermostat will not cycle on. When hot water is drawn from the tank, the bottom thermostat 18 may cycle on first, but very shortly thereafter the top thermostat will close and thus deenergize the bottom heating element 10 keeping the top thermostat 16 as the principal temperature control element of the water heater.

Although the present invention has been described with a certain degree of particularity, it should be understood that the present disclosure has been made only by way of example and numerous changes in the details of construction and the combination and arrangement of parts and elements may be resorted to without departing from the scope and spirit of the present invention.

I claim as my invention:

1. In an electric water heater including a storage tank having an inlet and an outlet spaced therefrom and having a first heating element positioned adjacent the tank outlet and a second heating element positioned adjacent the inlet, the improvement of a temperature control system comprising, a first thermostat having a narrow temperature differential in the order of about 12° F. and being responsive to the water temperature in one portion of the water heater, said first thermostat comprising a double throw switch including a first set of contacts opperatively connected in series with said first heating element, a second set of contacts operatively connected in series with said second heating element, a first bridge member comprising a high resistance, heat producing material to produce heat sufficient to match the wattage rating of said first heating element and being operative to complete a circuit between said first set of contacts in response to the water temperature in one portion of the water heater being below a predetermined temperature, and a second bridge member comprising a low resistance, non-heat producing material being operative to complete a circuit between said second set of contacts in response to the water temperature in the one portion of said water heater exceeding a predetermined value; and a second temperature thermostat responsive to the water temperature in another portion of the water heater, said second thermostat including a single throw switch operatively connected in series with said second set of contacts, said single throw switch being operative to complete a circuit therethrough in response to the water temperature in the other portion of the water heater being below a predetermined temperature and to provide an open circuit therethrough in response to the water temperature in the other portion of the water heater exceeding a predetermined temperature.

2. In an electric water heater including a storage tank having an inlet and an outlet spaced therefrom and having a first heating element positioned adjacent the tank outlet and a second heating element positioned adjacent the inlet, the improvement of a temperature control system comprising, a first thermostat having a narrow temperature differential in the order of about 12° F. and being responsive to the water temperature in one portion of the water heater, said first thermostat comprising a double throw switch including a first set of contacts operatively connected in series with said first heating element, a second set of contacts operatively connected in series with said second heating element, a first bridge member comprising a high resistance, heat producing metal to produce heat sufficient to match the wattage rating of said first heating element and being operative to complete a circuit between said first set of contacts in response to the water tempearture in one portion of the water heater being below a predetermined temperature, and a second bridge member comprising a low resistance, non-heat producing metal being operative to complete a circuit between said second set of contacts in response to the water temperature in the one portion of said water heater exceeding a predetermined value; and a second thermostat responsive to the water temperature in another portion of the water heater, said second thermostat including a third set of contacts operatively connected in series with said second set of contacts of said first thermostat and a third bridge member comprising a high resistance, heat producing metal to produce heat sufficient to match the wattage rating of said second heating element and being operative to complete a circut therethrough in response to the water temperature in the other portion of the water heater being below a predetermined temperature and to provide an open circuit therethrough in response to the water temperature in the other portion of the water heater exceeding a predetermined temperature.

3. In an electric water heater including a storage tank having a top outlet portion and a bottom inlet portion and having a top heating element in said top portion and a bottom heating element in said bottom portion, the improvement of a temperature control system comprising, a top temperature responsive device having a narrow temperature differential in the order of about 12° F. and being responsive to the water temperature in the top portion of the water heater, said top temperature responsive device comprising a top control double throw switch including a top set of contacts operatively connected in series with said top heating element, a bottom set of contacts operatively connected in series with said bottom heating element, a top bridge member comprising a high resistance, heat producing metal material to produce heat sufficient to match the wattage rating of said top heating element and being operative to complete a circuit between said top set of contacts in response to the water in the top portion of the water heater being below a first predetermined temperature, and a bottom bridge member comprising a low resistance, non-heat producing metal material being operative to complete a circuit between said bottom set of contacts in response to the water temperature in the top portion of said water heater exceeding a predetermined value; and a bottom temperature responsive device responsive to the water temperature in the bottom portion of the water heater, said bottom temperature responsive device including a bottom temperature control switch operatively connected in series with said bottom set of contacts and said bottom heating element, said bottom switch being operative to complete a circuit therethrough in response to the water temperature in the bottom portion of the water heater being below a second predetermined temperature and to provide an open circuit therethrough in response to the water temperature in the bottom portion of the water heater exceeding a predetermined temperature, with the first predetermined water temperature being substantially higher than the second predetermined water temperature.

4. In an electric water heater including a storage tank having a top outlet portion and a bottom inlet portion and having a top heating element in said top portion and a bottom heating element in said bottom portion, the improvement of a temperature control system comprising, a top thermostat having a narrow temperature differential in the order of about 12° F. and being responsive to the water temperature in the top portion of the water heater, said top thermostat comprising a top control double throw switch including a top set of contacts connected in series with said top heating element, a bottom set of contacts connected in series with said bottom heating element, a closing member alternately operative to complete a circuit between said top set of contacts and provide an open circuit between said bottom set of contacts and vice versa, said closing member including a top bridge member comprising a high resistance, heat producing metal being operative to complete a circuit between said top set of contacts in response to the water temperature in the top portion of the water heater being below a predetermined temperature and thereby energize said top heating element, the heat produced by said heat producing metal matching the wattage rating of said top heater element, and a bottom bridge member comprising a low resistance, non-heat producing metal being operative to complete a circuit between said bottom set of contacts in response to the water temperature in the top portion of said water heater exceed- tom portion of the water heater, said bottom thermostat having a wide temperature differential of about 30° F. and being responsive to the water temperature in the bottom portion of the water heater, said bottom thermostat including a bottom temperature control single throw switch connected in series with said bottom set of contacts of said top thermostat and said bottom heating element, said bottom switch being operative to complete a circuit therethrough in response to the water temperature in the bottom portion of the water heater being below a predetermined temperature and to provide an open circuit therethrough in response to the water temperature in the bottom portion of the water heater exceeding a predetermined temperature, with the predetermined water temperature to complete a circuit between said top set of contacts of said top thermostat being above that required to complete a circuit in said bottom switch of said bottom thermostat, the bottom heating element being energized when a circuit is completed between said bottom set of contacts of said top thermostat and through said bottom switch of said bottom thermostat.

5. In an electric water heater including a storage tank having a top outlet portion and a bottom inlet portion and having a top heating element in said top portion and a bottom heating element in said bottom portion, the improvement of a tempertaure control system comprising a top thermostat having a narrow temperature differential in the order of about 12° F. and being responsive to the water temperature in the top portion of the water heater, said top thermostat comprising a top control double throw switch including a top set of contacts connected in series with said top heating element, a bottom set of contacts connected in series with said bottom heating element, a closing member alternately operative to complete a circuit between said top set of contacts and provide an open circuit between said bottom set of contacts and vice versa, said closing member including a top bridge member comprising a high resistance, heat producing metal being operative to complete a circuit between said top set of contacts in response to the water temperature in the top portion of the water heater being below a predetermined temperature and thereby energize said top heating element, the heat produced by said heat producing metal matching the wattage rating of said top heater element, and a bottom bridge member comprising a low resistance, non-heat producing metal being operative to complete a circuit between said bottom set of contacts in response to the water temperature in the top portion of said water heater exceeding a predetermined value; and a bottom thermostat having a wide temperature differential of about 30° F. and being responsive to the water temperature in the bottom portion of the water heater, said bottom thermostat including a bottom temperature control single throw switch comprising a set of contacts and a bridge member, said set of contacts of said bottom thermostat connected in series with said bottom set of contacts of said top thermostat and bottom heating element, said bridge member of said bottom switch comprising a high resistance, heat producing metal, said bottom switch being operative to complete a circuit through said bridge member of said bottom switch in response to the water temperature in the bottom portion of the water heater being below a predetermined temperature and to provide an open circuit therethrough in response to the water temperature in the bottom portion of the water heater exceeding a predetermined temperature, the heat produced in the heat producing metal of said bridge member of said bottom switch matching the wattage rating of said bottom heating element, with the predetermined water temperature to complete a circuit between said top set of contacts of said top thermostat being substantially above that required to complete a circuit in said bottom switch of said bottom thermostat, the bottom heating element being energized when a circuit is completed between said bottom set of contacts of said top thermostat and through said bottom switch of said bottom thermostat.

6. The method of controlling the operation of that type of upright-tank, electric water heater having an upper portion with a water outlet and an upper heating element, and a lower portion with a water inlet and a lower heating element, and having an upper thermostatic switch responsive to the water temperature in the upper portion of the tank, the switch comprising a double throw switch including a first set of contacts operatively connected in series with said upper heating element in one position and a second set of contacts operatively connected in series with said lower heating element in another position, and having a lower thermostatic switch responsive to the water temperature in the lower portion of the tank and comprising a single set of contacts operatively connected in series in a closed position with said lower heating element and said second set of contacts:

adjusting the upper thermostatic switch to a relatively narrow temperature differential, of about 12° F., with the upper value of the differential being the water temperature desired by the user;

adjusting the lower thermostatic switch to a temperature differential having an upper value substantially below the lower value of the differential of the upper thermostatic switch;

the setting of the lower temperature value of the upper thermostatic switch being sufficiently high, relative to the desired water temperature, to result in an early energization of the upper heating element, with the simultaneous deenergization of the lower heating element through operation of said upper thermostatic switch to said one position when a large withdrawal of water from said tank occurs so that said upper element can thereby effect a fast recovery of temperature of water localized adjacent the top of the tank and subject to the first subsequent withdrawal of water from the tank.

References Cited
UNITED STATES PATENTS

| 1,892,557 | 12/1932 | McCormick | 219—321 |
| 2,011,610 | 8/1935 | Bletz | 200—122 |
| 2,038,476 | 4/1936 | Clark et al. | 219—321 X |
| 2,039,030 | 4/1936 | Reifenberg | 219—511 X |
| 2,237,808 | 4/1941 | Berg | 219—321 X |
| 2,380,545 | 7/1945 | Pankow | 219—321 |
| 3,246,119 | 4/1966 | Kinsella | 219—321 |

ANTHONY BARTIS, *Primary Examiner.*